US011670301B2

United States Patent
Gupta

(10) Patent No.: US 11,670,301 B2
(45) Date of Patent: *Jun. 6, 2023

(54) LIP-READING SESSION TRIGGERING EVENTS

(71) Applicant: eBay Inc., San Jose, CA (US)

(72) Inventor: Neeraj Gupta, Milpitas, CA (US)

(73) Assignee: eBay Inc., San Jose, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/347,263

(22) Filed: Jun. 14, 2021

(65) Prior Publication Data

US 2021/0304768 A1  Sep. 30, 2021

Related U.S. Application Data

(63) Continuation of application No. 16/528,401, filed on Jul. 31, 2019, now Pat. No. 11,069,357.

(51) Int. Cl.
| | |
|---|---|
| *G10L 15/00* | (2013.01) |
| *G10L 15/25* | (2013.01) |
| *G10L 15/22* | (2006.01) |
| *G06F 3/16* | (2006.01) |
| *G10L 15/26* | (2006.01) |

(52) U.S. Cl.
CPC .............. *G10L 15/25* (2013.01); *G06F 3/167* (2013.01); *G10L 15/22* (2013.01); *G10L 15/26* (2013.01); *G10L 2015/223* (2013.01)

(58) Field of Classification Search
CPC .................................. G10L 15/25; G10L 17/22
See application file for complete search history.

(56) References Cited

U.S. PATENT DOCUMENTS

| | | | |
|---|---|---|---|
| 11,069,357 B2 | 7/2021 | Gupta | |
| 11,508,374 B2 * | 11/2022 | Abou Antoun | G06N 3/08 |
| 2004/0117191 A1 | 6/2004 | Seshadri | |
| 2010/0079573 A1 | 4/2010 | Isaac | |
| 2012/0191449 A1 | 7/2012 | Lloyd et al. | |
| 2015/0088518 A1 | 3/2015 | Kim et al. | |
| 2017/0195629 A1 * | 7/2017 | Wexler | G06F 3/167 |
| 2017/0309275 A1 * | 10/2017 | Takayanagi | G10L 15/32 |
| 2018/0350366 A1 * | 12/2018 | Park | G10L 15/30 |

(Continued)

FOREIGN PATENT DOCUMENTS

KR         20200073733 A  *  6/2020

OTHER PUBLICATIONS

Non-Final Office Action received for U.S. Appl. No. 16/528,401, dated Dec. 14, 2020, 12 Pages.

(Continued)

*Primary Examiner* — Daniel Abebe
(74) *Attorney, Agent, or Firm* — FIG. 1 Patents

(57) ABSTRACT

Techniques for lip-reading session triggering events are described. A computing device is equipped with lip-reading capability that enables the device to "read the lips" (i.e., facial features) of a user. The computing device determines when a triggering event occurs to automatically cause the computing device to switch from one input type to a lip-reading session. Lip-reading is also used in conjunction with other types of inputs to improve accuracy of the input. Machine learning is used to personalize the lip-reading capability of the computing device for a particular user.

20 Claims, 12 Drawing Sheets

(56) References Cited

U.S. PATENT DOCUMENTS

| | | | |
|---|---|---|---|
| 2019/0019508 A1* | 1/2019 | Rochford | G06F 3/013 |
| 2019/0198022 A1* | 6/2019 | Varner | G10L 25/57 |
| 2019/0279642 A1 | 9/2019 | Shukla et al. | |
| 2020/0105262 A1* | 4/2020 | Abhinav | G10L 15/25 |
| 2020/0154187 A1* | 5/2020 | Fukumoto | G10L 15/22 |
| 2020/0193992 A1* | 6/2020 | Kim | H04N 5/232 |
| 2020/0234479 A1 | 7/2020 | Teruuchi | |
| 2021/0035585 A1 | 2/2021 | Gupta | |
| 2021/0110831 A1* | 4/2021 | Shillingford | G10L 15/197 |
| 2021/0183391 A1* | 6/2021 | Lin | G06K 9/6217 |
| 2021/0280191 A1* | 9/2021 | Geng | G10L 15/22 |
| 2021/0327431 A1* | 10/2021 | Stewart | G06V 40/45 |
| 2022/0369056 A1* | 11/2022 | Stachura | G10L 25/78 |

OTHER PUBLICATIONS

Notice of Allowance Received for U.S. Appl. No. 16/528,401, dated Apr. 9, 2021, 7 pages.
Liopa, "Visual Speech Recognition", © Copyright 2019—Liopa, Retrieved from the Internet URL : <https://liopa.ai/>, 2019, 5 pages.
Wikipedia, "Multi-factor authentication", Retrieved from the Internet: <URL: http://en.wikipedia.org/wiki/Multi-factorauthentication, 14 pages.

* cited by examiner

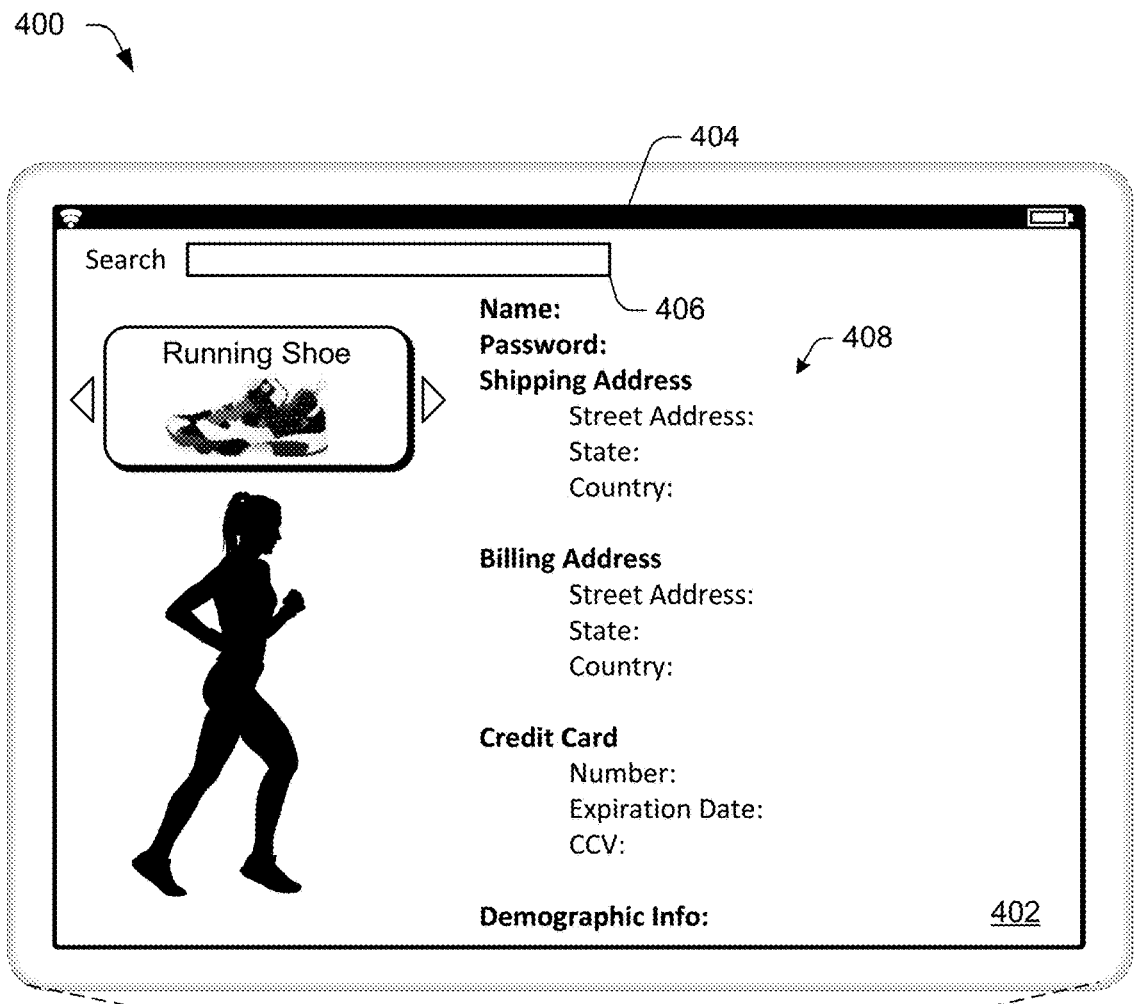
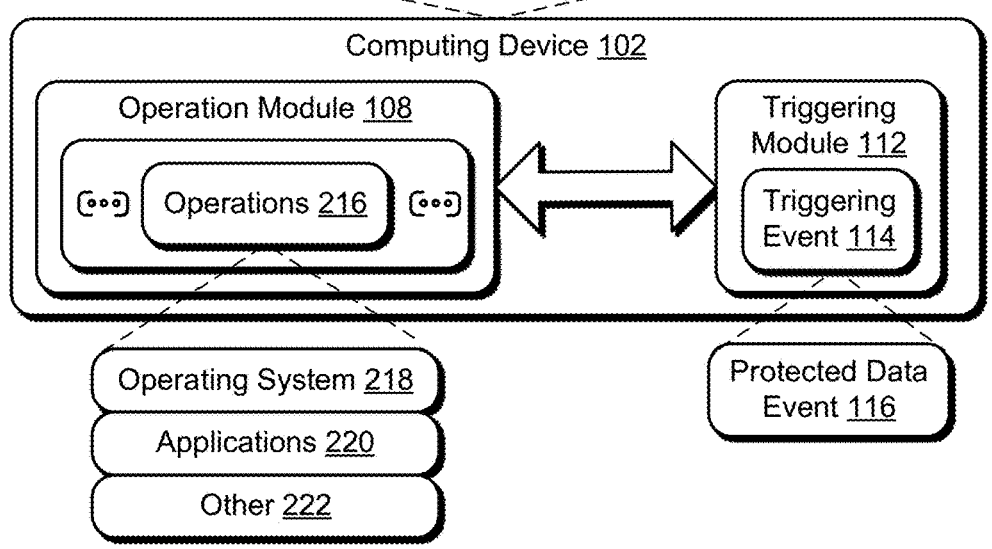
Fig. 4

900

902
Receive audio data and digital images captured by an audio input device and a digital camera, respectively, involving a user's speech

904
Generate audio text from the audio data using speech-to-text functionality and lip-reading text from the digital images based on visual cues associated with the user's speech using lip-reading functionality

906
Identify a computing-device operation based on the audio text and the lip-reading text

908
Generate filtered data by filtering the audio text or the lip-reading text based on relevancy to the identified operation

910
Initiate at least one operation of the computing device based on the filtered data

Fig. 9

LIP-READING SESSION TRIGGERING EVENTS

RELATED APPLICATIONS

This application is a continuation of and claims priority to U.S. patent application Ser. No. 16/528,401, filed Jul. 31, 2019, entitled "Lip-Reading Session Triggering Events," the disclosure of which is hereby incorporated by reference in its entirety.

BACKGROUND

Mobile devices have become an integral part of a user's everyday life. A mobile phone, for instance, may be used to read emails, engage in social media, capture digital images, communicate via instant messages, and so forth. More and more, mobile phones are becoming a user's primary digital device, used for purchasing items and the transfer of personal information or confidential documents. However, a mobile device configuration may introduce challenges and complexity in support of user interactions with these devices. For instance, a mobile phone may have a limited ability to support entry of text, creating a difficult and cumbersome data entry experience.

The advent of digital assistant technology has alleviated some of these challenges. However, a digital assistant also introduces new challenges. For instance, conventional techniques to enter data using a digital assistant can become compromised in some situations because use of the digital assistant typically involves audible speech. Thus, conventional digital assistant techniques permit any person, device capable of recording speech, or another digital assistant, within the vicinity of the user to also observe this speech. This is especially problematic when entering sensitive or confidential information. In addition, certain environmental conditions render some input techniques ineffectual. If ambient noise is high, for instance, voice recognition functionality may not function properly. Thus, these limitations may result in inefficient user interaction with the device as well as inefficient use of computational resources of the device due to repeated user interactions required to achieve a desired result.

SUMMARY

Techniques for lip-reading session triggering events are described. These techniques are implemented to overcome the challenges and inefficiencies of conventional data entry using mobile computing devices. A computing device is equipped with lip-reading capability that enables the device to "read the lips" (i.e., facial features) of a user as the user mouths commands silently to input data, browse the Internet, request information, command an action for a smart home system, and so forth. As part of this, the computing device may determine whether a triggering event has occurred to automatically initiate a lip-reading session, e.g., causing the computing device to switch from one input type (voice recognition or touchscreen input) to a lip-reading session. This is an improvement over conventional digital assistant technology that typically uses voice recognition. During a lip-reading session, for instance, a user may interact with a digital assistant solely using visual cues.

A triggering event may be based on a variety of factors, such as a physical environment, a geographic location, a temporal event, the sensitive nature of data being requested for input, and so forth. In one example, a sudden increase in ambient noise may trigger a device to automatically initiate a lip-reading session. In another example, a particular geographic location, at which, noise is to be kept to a minimum may trigger a lip-reading session, such as a library, classroom, and so forth. In yet another example, the computing device may determine that data to be input is of a sensitive or confidential nature (e.g., involves a credit card number or social security number), identification of which is then used to automatically trigger a lip-reading session. Alternately or additionally, a user may set custom parameters used to trigger a lip-reading session that are dependent on location, time of day, type of data to be entered, physical environment, and so forth. A user may also use a verbal command, menu selection, and so forth to manually trigger a lip-reading session.

Computing devices that support lip-reading session triggering events may also be personalized for a particular user. Multiple base models (e.g., machine learning models) may be provided that represent different languages, dialects, geographic locations, and so forth. Machine learning can then be used to train the model by the computing device to recognize a user's specific speech, visual cues (e.g., lip, tongue, eye, chin, cheek, head, shoulder movements), facial expressions, hand gestures, and mannerisms, thus personalizing the computing device for the particular user and adding another level of security.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 4 depicts an example implementation in which a triggering event is implemented as a protected data event.

FIG. 9 is a flow diagram depicting a procedure in an example implementation of lip-reading in conjunction with voice recognition to improve accuracy and efficiency of the computing device operations.

DETAILED DESCRIPTION

Overview

Figure 1:
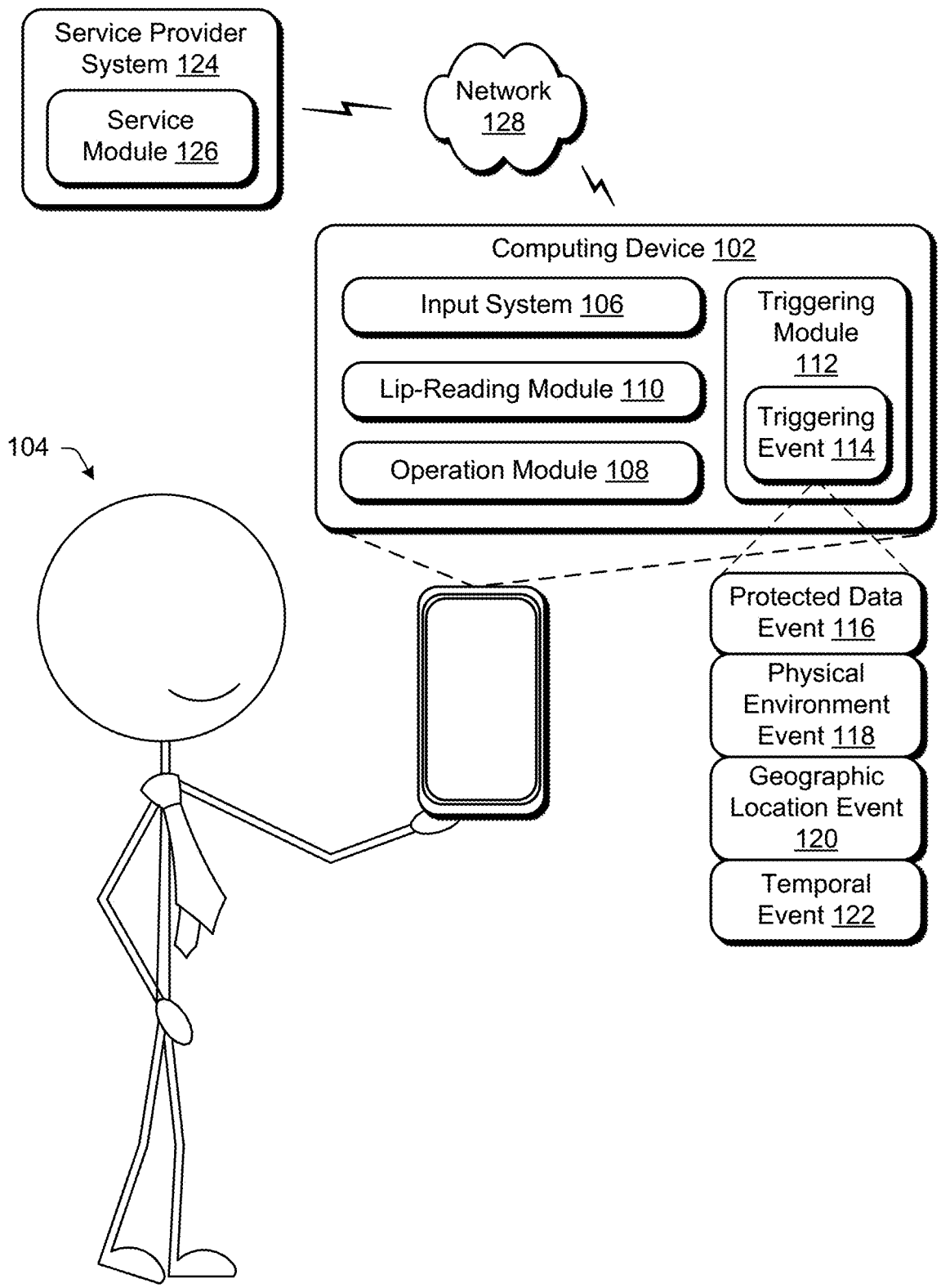
FIG. 1 is an illustration of an environment in an example implementation that is operable to employ lip-reading session triggering event techniques described herein.

The reliance on mobile devices is more prevalent than ever before. However, mobile devices typically have a limited ability to support efficient user inputs due to limitations of a form factor that makes these devices mobile. For example, text entry on conventional mobile devices and dedicated devices used to implement personal digital assistants presents a significant challenge due to lack of a physical keyboard. In addition, the advent of voice recognition and digital assistant technology to overcome these limitations presents additional concerns regarding the ease at which sensitive or confidential information may be compromised. Furthermore, the sensitivity to environmental conditions (e.g., ambient noise) when using voice recognition technology may limit the environment in which such technology may be used. Thus, user interactions with these devices may be difficult, cumbersome, and inefficient, as well as unsecure due to these limitations.

Accordingly, lip-reading sessions are implemented in the following discussion to address these challenges. Lip-reading sessions may be used to alleviate these issues, for instance, when changes in environmental conditions make other types of input inconvenient and ineffective, when other types of inputs create a security risk when the data to be input is sensitive or confidential, and so forth.

In one example, data entry using voice recognition functionality of a computing device may be interrupted by a surge in ambient noise, e.g., when conversing people approach, traffic, and so forth. When multiple people speak, for instance, a voice recognition system may not accurately interpret audible input. However, a device capable of lip-reading may be used to address this problem.

In another example, lip-reading sessions may be used to keep sensitive information confidential. More and more a user's personal business is conducted through the Internet. For example, personal banking, purchasing products, applying for jobs, registering for educational classes or seminars, and so forth. Many of these activities involve input of sensitive or confidential information, such as a credit card number, social security number, bank account number, address, birthdate, password, mother's maiden name, and so forth. Accordingly, a lip-reading session may be used to reduce a chance that a user's personal information is compromised and a user may conduct their personal business in any environment and still be assured of confidentiality. For instance, a computing device capable of lip-reading can be used in a public place to securely input a credit card number to purchase a product with a reduced likelihood of being compromised by malicious parties.

Additionally, triggering events are described that may be used to invoke a lip-reading session. Use of a triggering event by the computing device supports automated, seamless, and intuitive device input when changes in environmental conditions make other types of input inconvenient and ineffective, when other types of input create a security risk when the data to be input is sensitive or confidential, and so forth. Triggering events, for instance, allow a computing device to automatically initiate a lip-reading session when the environment or sensitive nature of the data being input make other ways of inputting data inconvenient, inefficient, or unsecure. Examples of triggering events include a protected data event as further described in relation to FIG. 4, a physical environment event as further described in relation to FIG. 5, a geographic location event as further described in relation to FIG. 6, a temporal event as further described in relation to FIG. 7, and so forth. In this way, triggering events may be used to increase input accuracy to the computing device and thus also computational efficiency of the device.

In another example, a lip-reading session is used in conjunction with other input types (e.g., voice recognition technology) to further improve accuracy and convenience of user interaction with a computing device. A lip-reading session, for instance, may be used to verify other types of inputs entered into a computing device. The computing device, for instance, may be configured to determine an operation from text generated as part of a lip-reading session and another input type, e.g., voice recognition functionality. Data relevant to that operation determined from both types of inputs may then be used to initiate the corresponding accuracy. In this way, the lip-reading session may be used to increase input accuracy of other input types to the computing device and thus also computational efficiency of the device, further discussion of which may be found in relation to FIGS. 8-9.

Techniques and systems of triggering events described herein are further configured to adapt to particular visual cues associated with a user's particular speech and mannerisms using machine learning. To begin, multiple speech models are provided that have been trained using machine learning to detect visual cues associated with speech, from which a user can choose as a base model. These models are trained using machine learning based on different languages, dialects, geographic locations, support of different functionality (e.g., technical words and phrases, ecommerce-specific terms), and so forth. A base model selected by a user is then further personalized using machine learning to train the computing device to recognize a user's specific speech and mannerisms. In this way, accuracy and efficiency of training a model using machine learning may be improved through use of the based model, thereby improving operation of a computing device and user interaction with the computing device, further discussion of this example may be found in relation to FIGS. 10-11.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ lip-reading session triggering events described herein. The illustrated environment 100 includes a computing device 102 illustrated as being held by a user 104. The computing device 102 may be configured in a variety of ways.

The computing device 102, for instance, may be configured as a desktop computer, a laptop computer, a mobile device (e.g., assuming a handheld configuration such as a tablet or mobile phone as illustrated), a dedicated personal digital assistant device, and so forth. Thus, the computing device 102 may range from full resource devices with substantial memory and processor resources (e.g., personal computers, game consoles) to a low-resource device with limited memory and/or processing resources (e.g., mobile devices, personal digital assistance devices). Additionally, although a single computing device 102 is shown, the computing device 102 may be representative of a plurality of different devices, such as multiple servers utilized by a business to perform operations "over the cloud" as described in FIG. 12.

The computing device 102 is illustrated as including an input system 106. The input system 106 may include any device implemented by the computing device to receive inputs from a user or otherwise, such as a digital camera, depth sensor, microphone, virtual keyboard, physical keyboard, touchscreen, radar sensing device (e.g., via Wi-Fi waves), and so forth. The input system 106 is configured to detect a user input (e.g., via an input device) and convert the detected input into data (e.g., via analog to digital conversion), such as to display the text on a user interface using a display device. Alternately or in addition, the input system 106 may receive a command to initiate some type of action other than a text display. For example, a command may be received to open an application, send a document, purchase a product, and so forth. Other examples are also contemplated, such as to detect conditions of a physical environment, in which, the computing device is disposed.

The computing device 102 also includes an operation module 108. By way of example and not limitation, the operation module 108 is representative of functionality to execute operations of the computing device 102 (e.g., using a processing system and computer-readable storage media), such as the computing device operating system, applications, hardware device operations, and so forth.

The computing device 102 is also configured with a lip-reading module 110. The lip-reading module 110 is configured to implement a lip-reading session in order to "read the lips" of a user 104 and in response initiate one or more operations of the operation module 108. The user 104, for instance, may utter commands (with or without making a sound) to input data, browse the Internet, request information, command an action, and so forth through interaction with the lip-reading module.

In one example, the lip-reading module 110 employs an imager such as a digital camera as part of the input system 106 to capture digital images (singly or as part of a digital video) of the user's 104 lips, mouth, and/or facial movements while the user 104 is speaking, either audibly or silently. The lip-reading module 110 then analyzes visual cues from the movements and/or position of the user's 104 facial features and compares the analyzed results to a known model of lip, mouth, and facial movements to determine "what is being uttered." For example, the lip-reading module 110 may identify facial features (e.g., corners of mouth, top of lips, cheeks nose, teeth) and based on a relationship of these features to each other, and how that relationship changes over time as visual cues to determine "what is being mouthed" by the user 104 even if sounds are not made by the user 104. In another implementation, the lip-reading module 110 may also use a video recorder or depth sensor (e.g., time-of-flight camera, structured light grid array) as part of the input system 106, separately or in combination with a digital camera, or any sensor other than a sensor for audio detection, to assist in the capture of a user's lip, mouth, and facial movements.

A lip-reading session refers to initiate of a mode in which visual cues of a user's 104 facial features are analyzed by the lip-reading module 110 until a result (e.g., text 214) is generated. The lip-reading session may be initiated by the lip-reading module 110 to implement a variety of functionality. A lip-reading session, for instance, is especially useful when a manual input device, such as a keyboard or touchscreen, is not available or convenient, the environment the device is in is especially loud, when a physical environmental in which the computing device 102 is disposed requests silence, and so forth. A lip-reading session is also a useful security measure. For instance, a device used to make a purchase via the Internet may request entry of sensitive information, e.g., a credit card number, personally identifiable information such as a driver's license number or social security number, and so forth. A lip-reading session may therefore be used to keep sensitive information confidential by reducing a likelihood that that information is heard or seen by malicious parties proximal to the user 104.

The computing device 102 also includes a triggering module 112. The triggering module 112 is configured to control when the lip-reading module 110 initiates a lip-reading session. To do so, the triggering module 112 is configured to detect triggering events 114. If an input received via the input system 106, for instance, is determined to be a triggering event 114, the triggering module 112 initiates the lip-reading session automatically and without user intervention, thus eliminating the inefficiencies involved as part of manual initiation of the lip-reading session.

A triggering event 114 is an event that signals to the triggering module that initiation of a lip-reading session is desired. By way of example and not limitation, a triggering event 114 may include a protected data event 116, a physical environment event 118, a geographic location event 120, a temporal event 122, and so forth.

A protected data event 116 is a triggering event that occurs when the computing device 102 senses that data to be input is of a sensitive and confidential nature and is to be kept private, such as a credit card number. For example, the computing device 102 may recognize that an input field for a social security number as requesting confidential information and therefore involves a protected data event 116. The triggering module 112 can then initiate a lip-reading session by the lip-reading module 110 to support lip-reading inputs such that the data is not compromised (i.e., "overheard") by potentially malicious parties. Further discussion of protected data events 116 may be found in relation to FIG. 4.

A physical environment event 118 occurs when a change in the physical environment is detected by the triggering module 112 of the computing device 102, e.g., that renders other input modes ineffective. For instance, a surge in ambient noise may be considered a physical environment event 118 because the increased noise may inhibit a voice recognition input from being properly interpreted. The triggering module 112 can recognize a surge in ambient noise as a physical environment event 118 and automatically initiate the lip-reading session. This may be implemented as a switch from a voice recognition session to the lip-reading session that permits the user 104 to seamlessly continue with the input without manually controlling "how" that input is recognized, e.g., from audio data of a microphone to digital images captured by a digital camera. As a result, user and operational efficiency of the computing device 102 is improved. Further discussion of physical environment events 118 may be found in relation to FIG. 5.

A geographic location event 120 occurs when the input system 106 detects that the computing device 102 is located at a particular geographic location. The triggering module 112, for instance, may receive inputs from the input system 106 indicating a particular geographic location, e.g., involving use of GPS functionality, cell tower triangulation, and so forth. From this, the triggering module 112 may determine characteristics of the geographic location that warrant initiation of a lip-reading session by the lip-reading module 110. The triggering module 112, for instance, may determine from a name associated with the geographic location that the computing device 102 is located at a physical location that requires silence, such as a library. In this way, the triggering module 112 and lip-reading module 110 may respond, automatically and without user intervention, to characteristics of geographic locations. Further discussion of geographic location events 120 may be found in relation to FIG. 6.

A temporal event 122 involves identification of a particular point-in-time that may be used as a basis to initiate a lip-reading session of the lip-reading module 110. The temporal event 122, for instance, may indicate a time of day (e.g., night), day of week, an event from a user's calendar (e.g., the user is scheduled as being at a meeting), and so forth. A user, for instance, may then provide inputs detected using the lip-reading module 110 silently within a meeting without disturbing others participating in the meeting based on identification that the user 104 is likely in a meeting. Further discussion of temporal events 122 may be found in relation to FIG. 7 in the following discussion.

Thus, a variety of different triggering events 114 may be leveraged to initiate a lip-reading session of the lip-reading module 110. For example, a user may set custom parameters used to trigger a lip-reading session. In another example, a time parameter may be set such that during a certain time period a lip-reading session is triggered. A trigger time, for instance, may be set for when other people in a household may be sleeping, such as an evening bedtime, or child's naptime. Another example of a physical environment event 118 includes physical location, such that when a device capable of lip-reading session triggering events is located in a classroom, at the user's place of work, or any other location chosen by the user, a lip-reading session will automatically be initiated. A variety of other examples are also contemplated, further discussion of which may be found in relation to the following sections.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Lip-Reading Session Triggering Events

Figure 2:
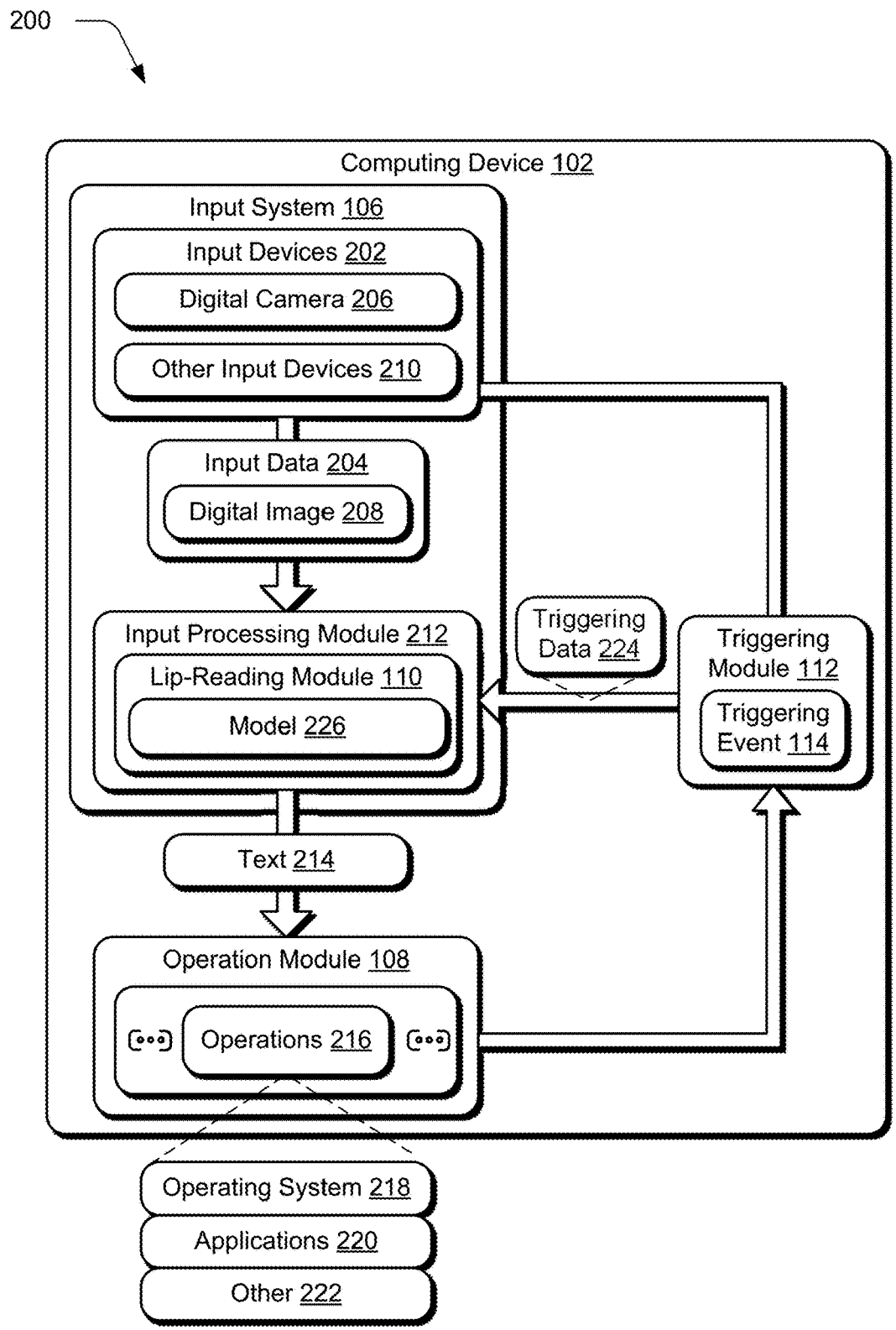
FIG. 2 depicts a system in an example implementation showing operation of an input system, operation module, and a triggering module of FIG. 1 in greater detail.
Figure 3:
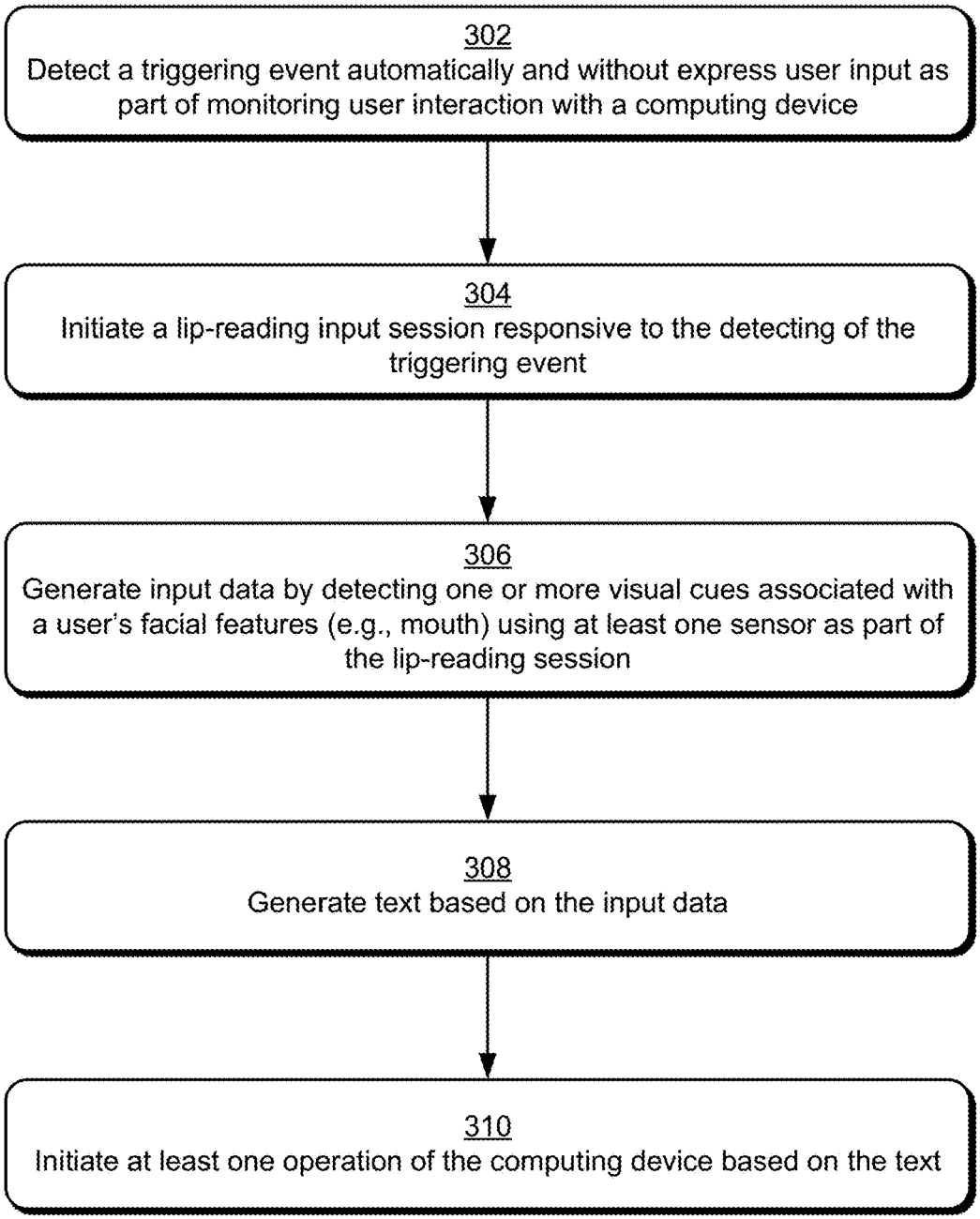
FIG. 3 is a flow diagram depicting a procedure in an example implementation in which triggering events are detected and used to initiate a lip-reading session.
Figure 5:
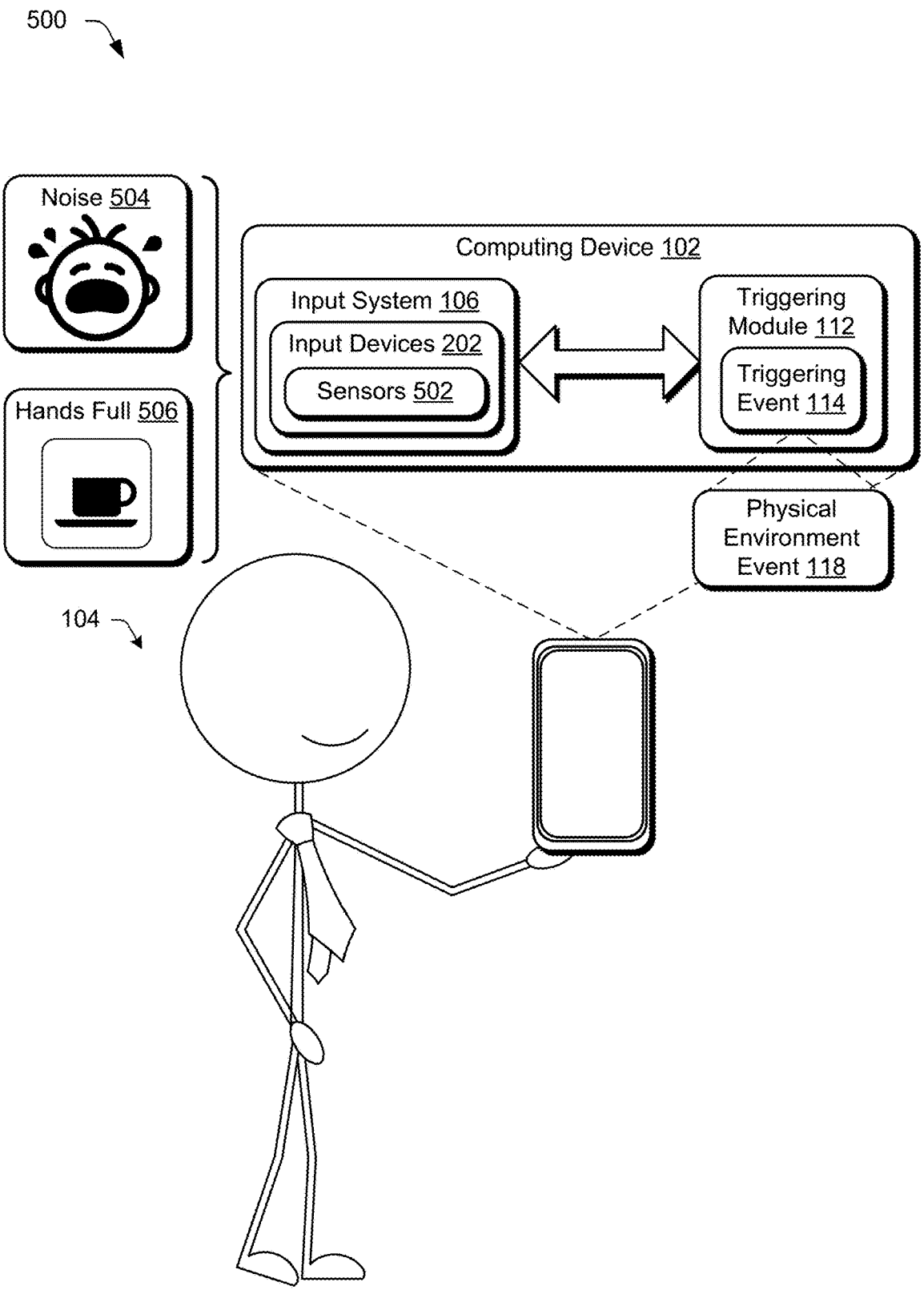
FIG. 5 depicts an example implementation in which a triggering event is implemented as a physical environment event.
Figure 6:
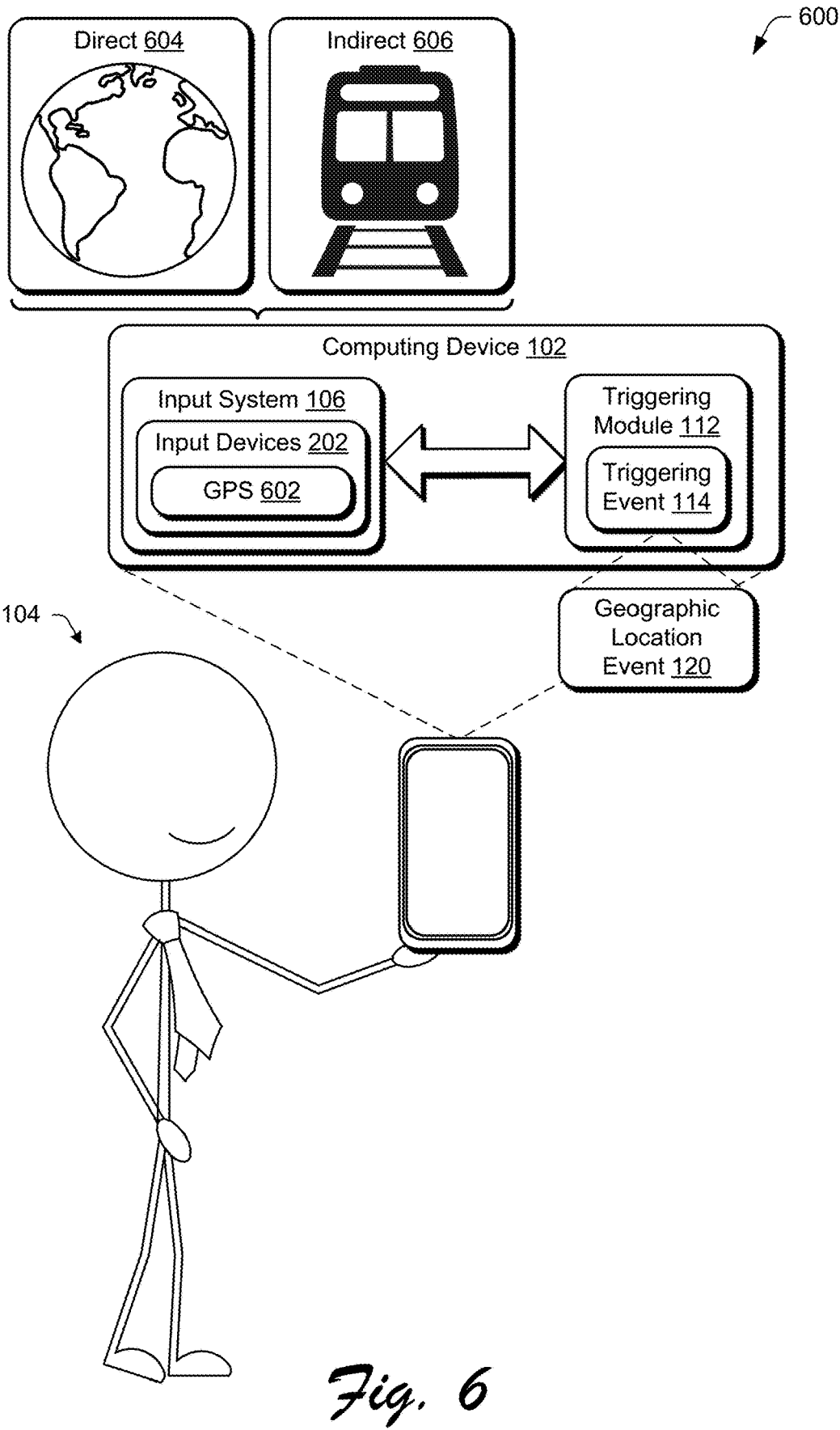
FIG. 6 depicts an example implementation in which a triggering event is implemented as a geographic location event.
Figure 7:
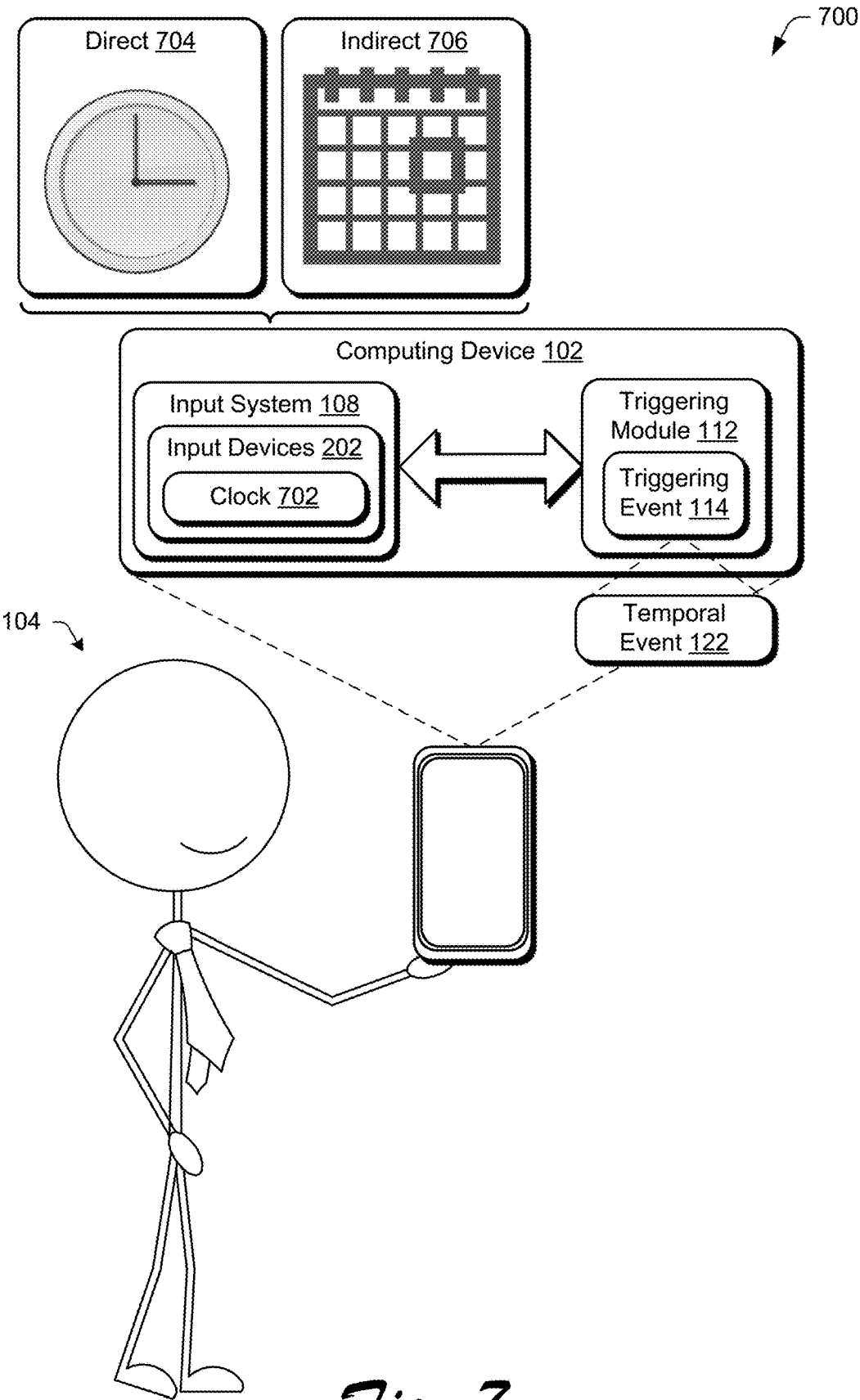
FIG. 7 depicts an example implementation in which a triggering event is implemented as a temporal event.

FIG. 2 depicts a system 200 in an example implementation showing operation of the input system 106, operation module 108, and the triggering module 112 of FIG. 1 in greater detail. FIG. 3 depicts a procedure 300 in which triggering events are detected and used to initiate a lip-reading session. FIG. 4 depicts an example implementation 400 in which a triggering event is implemented as a protected data event. FIG. 5 depicts an example implementation 500 in which a triggering event is implemented as a physical environment event. FIG. 6 depicts an example implementation 600 in which a triggering event is implemented as a geographic location event. FIG. 7 depicts an example implementation 700 in which a triggering event is implemented as a temporal event.

The following discussion describes techniques that may be implemented utilizing the previously described system and devices. Aspects of the procedure as shown stepwise by the modules of FIG. 2 and blocks of FIG. 3 may be implemented in hardware, firmware, software, or a combination thereof. The procedure is shown as a set of blocks that specify operations performed by one or more devices and are not necessarily limited to the orders shown for performing the operations by the respective blocks nor limited to inclusion of each of the blocks. In the following, reference is made interchangeably to FIGS. 1-7.

In this example, a triggering module 112 is implemented to detect triggering events 114 and when detected, initiate a lip-reading session of the lip-reading module 110. As part of this, an input device 202 of the input system 106 generates input data 204 which is leveraged by the triggering module 112 to detect "when" to initiate the lip-reading session. The input device 202 may be configured in a variety of ways. In one example, the input device 202 is configured as a digital camera 206 used to generate one or more digital images 208. The digital image 208, for instance, may be used as a basis to implement lip-reading functionality of the lip-reading module 110 based on visual cues of a user's facial features detected from the digital images 208.

Other input devices 210 are also contemplated as part of the input system 106. Examples of other input devices 210 include any device capable of receiving an input, such as from a sensor, and also includes devices configured to receive user inputs such as a visual, audible, or tactile inputs, or an input from another source. By way of example and not limitation, input devices 202 may include a physical keyboard, a virtual keyboard, a microphone, a digital video recorder, a touchscreen, a cursor control device (e.g., a mouse or trackpad), audio sensors that monitor noise level (e.g., a microphone), location sensors (e.g., GPS or other position determining sensors), temperature sensors, light sensors, digital cameras, depth sensors, pressure sensors, sensors configured to determine position of the computing device in three-dimensional space (e.g., accelerometers, altitude, axis), and so forth.

In a first lip-reading example, the input data 204 generated by the input device 202 includes a digital image 208, e.g., a single digital image or as part of a series of digital images forming a digital video captured by the digital camera 206. The input data 204 may also be generated using depth sensors, e.g., time-of-flight cameras, structured light grid arrays. In both examples, the input data 204 may be processed by the lip-reading module 110 of an input processing module to detect visual cues of the lips, mouth, and facial movements of a user 104 and correspondence of these visual cues with text 214, emotions, and so forth.

Based on these visual cues, the lip-reading module 110 generates an output (e.g., text 214) which is then usable by the operation module 108 to initiate one or more operations 216 of the computing device 102. Examples of operations 216 include operations of the operating system 218, applications 220, and other 222 software functionality executable by the computing device 102. Hardware operations are also contemplated, such as to provide tactile feedback, change settings of the hardware of the computing device 102, and so forth. By way of example and not limitation, operations 216 may thus include adjusting device functions (e.g., adjusting screen brightness or device volume), inputting data to applications 220, browsing the Internet, requesting information, commanding an action (e.g., a command to select a menu item or open an application), communicating with another device, and so forth.

Alternately or in addition, when the input device 202 is implemented as one or more of the other input devices 210, the input data 204 may include audible speech, typed letters, a virtual button selection, a menu selection, and so forth. When the input data 204 is audible speech, or when a user types letters on a physical or virtual keyboard, or selects letters with a mouse or track pad, the input processing module 212 may output the speech or letters as text 214 directly onto the visual display of the user interface rendered by a display device of the computing device 102.

The computing device also includes a triggering module 112 as previously described. The triggering module 112 is configured to also receive input data 204 from the input system 106, and more particularly from the input devices 202. From this, a triggering event 114 is detected and used to generate triggering data 224 to initiate a lip-reading session of the lip-reading module 110.

In one example, user interaction with a computing device 102 is monitored and a triggering event 114 is automatically detected (block 302) by the triggering module 112. A variety of triggering events 114 may be detected by the triggering module 112 using data received from the input system 106, including protected data events 116, physical environment events 118, geographic location events 120, temporal events 122, and so on.

FIG. 4 depicts an example 400 of a protected data event 116. In the illustrated example, a display device 402 of the computing device 102 outputs a user interface 404. The user interface 404 depicts a webpage of an online marketplace having a search feature. The user interface 404 further shows a pair of running shoes chosen for purchase from the search results.

The user interface 404 also includes a plurality of input fields 408, via which, a user is to enter information to purchase the desired running shoe. The triggering module 112 is configured in this example to receive data describing these fields as input data, and from this data, determine whether the fields request entry of protected data, e.g., data that is personally identifying (e.g., driver's license number, social securing number), billing information (e.g., credit card, billing address), and so forth. This may be performed by the triggering module 112 through semantic analysis to determine semantic similarity of the input fields to a list of protected information.

In the illustrated example, user information fields are shown in which information used to complete the purchase of the running shoes is requested. The triggering module 112 parses the input fields 408 and identifies fields that request entry of protected data, e.g., credit card information. Based on this analysis, the triggering module 112 flags this as a protected data event 116, and automatically initiates a lip-reading session (block 304). Input data 204 is then generated by a lip-reading module 110 by detecting one or more visual cues associated with a user's facial features (e.g., mouth) using at least one sensor as part as part of the lip-reading session (block 306), e.g., using a digital camera, depth sensors, and so on. Text 214 is generated by an input processing module 212 based on the input data 204 (block 308) (e.g., the credit card information), which is then used to initiate at least one operation of the computing device 102 (block 310), e.g., to enter the text in the input field in the user interface.

In this manner, when a user is entering data using voice recognition input, a keyboard, and so on, as soon as a credit card information field is reached, a triggering event 114 is detected by the triggering module 112 and a lip-reading session of the lip-reading module 110 is automatically initiated by the computing device 102. The user 104 can then silently mouth the credit card information (i.e., without speaking or otherwise providing an audible output) using mouth movements, facial expressions, and hand gestures to seamlessly continue inputting information required for the purchase of the running shoes from the online marketplace. Thus, the credit card information is protected from inadvertently being obtained by a bystander, or other electronic device.

Alternately or in addition, protected data events 116 may be customized depending on a user's preference, such that any field a user deems sensitive and prefers to keep confidential may trigger a protected data event 116. For example, some users may consider their billing address to be protected data, and the billing address may be set to trigger a protected data event 116. A variety of other types of protected data is also contemplated, such as health data (e.g., data protected by the Health Insurance Portability and Accountability Act known as HIPAA), access data such as username and password, and so forth.

FIG. 5 depicts an example 500 of the triggering event 114 as a physical environment event 118. In the illustrated example, the computing device 102 is being held by the user 104 during user interaction with the computing device 102, e.g., while interacting with an application and so forth. During this monitored user interaction, the triggering module 112 receives input data 204 from sensors 502 of the input system 106. The input data 204 describes conditions of a physical environment, in which, the computing device 102 is disposed and from this, determines whether conditions correspond with a physical environment event 118 that is to initiate a lip-reading session of the lip-reading module 110.

A variety of different types of physical environment events 118 may be used by the triggering module 112 to initiate a lip-reading session. In one example, the physical environment event 118 is based on conditions that may hinder the user 104 from conveniently, effectively, or efficiently using other input techniques of the input system 106. For example, a microphone of the input system 106 may be used as a basis to detect when the noise 504 in the physical environment reaches a level that hinders operation of voice recognition functionality.

The user 104, for instance, may enter data using voice recognition functionality to the computing device 102. The triggering module 112 monitors this user interaction, and from this, determines that voice recognition may be compromised. This may be detected using a microphone to determine that an amount of noise 504 in the physical environment has reached a threshold, and from this, detect the physical environment event 118 to initiate the lip-reading session. In another example, this may include detecting the physical environment event 118 as failure of voice recognition functionality of the computing device 102 to correctly operate, e.g., an inability to process inputs, repeated correction of inputs by a user, and so forth.

Other examples are also contemplated, such as brightness of a physical environment that may hinder an ability of a user 104 to view a keyboard output by a display device of the computing device 102, detecting that a user's 104 hands are full 506, and so forth. The triggering module 112, for instance, may detect that the user 104 is holding the computing device 102 and another object (e.g., a cup of coffee detected using the digital images 208 generated by the input system 106, or by using one of the other available sensors 502, a pressure sensor for instance) and thus automatically initiate a lip-reading session because entry of text via a keyboard output by the computing device 102 is no longer feasible.

FIG. 6 depicts an implementation 600 of the triggering event 114 as a geographic location event 120. In the instance, the geographic location event 120 is configured to initiate the lip-reading session based on considerations related to a geographic location, at which, the computing device 102 is disposed. The input system 106, for instance, may include position determining functionality, such as a GPS 602, based on cell tower triangulation, or any other functionality usable to determine a geographic location including an IP address associated with a wireless access point. Based on the determined location, the triggering module 112 may infer when to initiate the lip-reading session.

The geographic location event 120 may be implemented in a variety of ways to support a variety of functionality. In one example, the geographic location event 120 infers when to trigger the lip-reading session directly 604 based on the geographic location. The geographic location determined by the GPS 602, for instance, may be included in a list of coordinates maintained at the computing device 102 used to manage initiation of the lip-reading session.

The geographic location determined by the GPS 602 may also be indicative, indirectly 606, that access to data might be compromised, is not to be entered publicly, and so forth. The determined location, for instance, may be processed semantically to determine characteristics of a particular location, such as to determine that the computing device 102 is located at a library, museum, and so forth and therefore initiate the lip-reading session automatically based on this determination.

The position determining functionality may also be used to determine a mode of travel (e.g., based on speed and location) and from this implement a geographic location event 120, e.g., to initiate a lip-reading mode when the user is positioned on a train, plane, bus or other public transportation in which a user 104 may be "overhead" and/or interfere with other users at the geographic location. In this way, the geographic location event 120 may be leveraged in combination with the lip-reading session to expand functionality available via the computing device 102.

FIG. 7 depicts an implementation 700 of the triggering event 114 as a temporal event 122. Temporal considerations may also be addressed by the triggering module 112 through use of a temporal event 122. The input system 106, for instance, may include a clock 702 that indicates a time of day, day of week, month, year, and so on. From this, temporal events 122 may be configured to initiate a lip-reading session. A user, for instance, may provide inputs indicating that the lip-reading session is to be entered during "quiet hours" (e.g., bedtime, school hours, office hours, and so on) automatically so as to support inputs provided via lip reading that do not interfere with other nearby users, e.g., by mouthing words and phrases without audible sound.

Temporal events 122 may also be detected indirectly, such as through use of a user's calendar of appointments. The temporal event 122, for instance, may be detected based on access to a user's calendar that indicates the user is likely at a business meeting. Based on this, detection of the temporal event 122 causes the triggering module 112 to initiate a lip-reading session such that the user 104 may provide input during the meeting (e.g., by mouthing words or phrases without actually speaking the words or phrases) without disturbing others. In this way, access to functionality of the computing device 102 may be expanded, which is not possible using conventional techniques. Other examples are also contemplated.

Thus, a triggering event is detected automatically and without express user input (e.g., selecting a button or otherwise initiating the session) as part of monitoring user interaction with a computing device (block 302). Based on this a lip-reading session is initiated automatically and without user intervention (block 304). Input data 204 is then generated by a lip-reading module 110 by detecting one or more visual cues associated with a user's facial features (e.g., mouth) using at least one sensor as part of the lip-reading session (block 306), e.g., using a digital camera, depth sensors, and so on. Text 214 is generated by an input processing module 212 based on the input data 204 (block 308) (e.g., the credit card information), which is then used to initiate at least one operation of the computing device 102 (block 310), e.g., to enter the text in the input field in the user interface. In this way, operation of the computing device is improved along with computational and user efficiency in providing the inputs.

Lip-Reading in Conjunction with Other Types of Inputs

Figure 8:
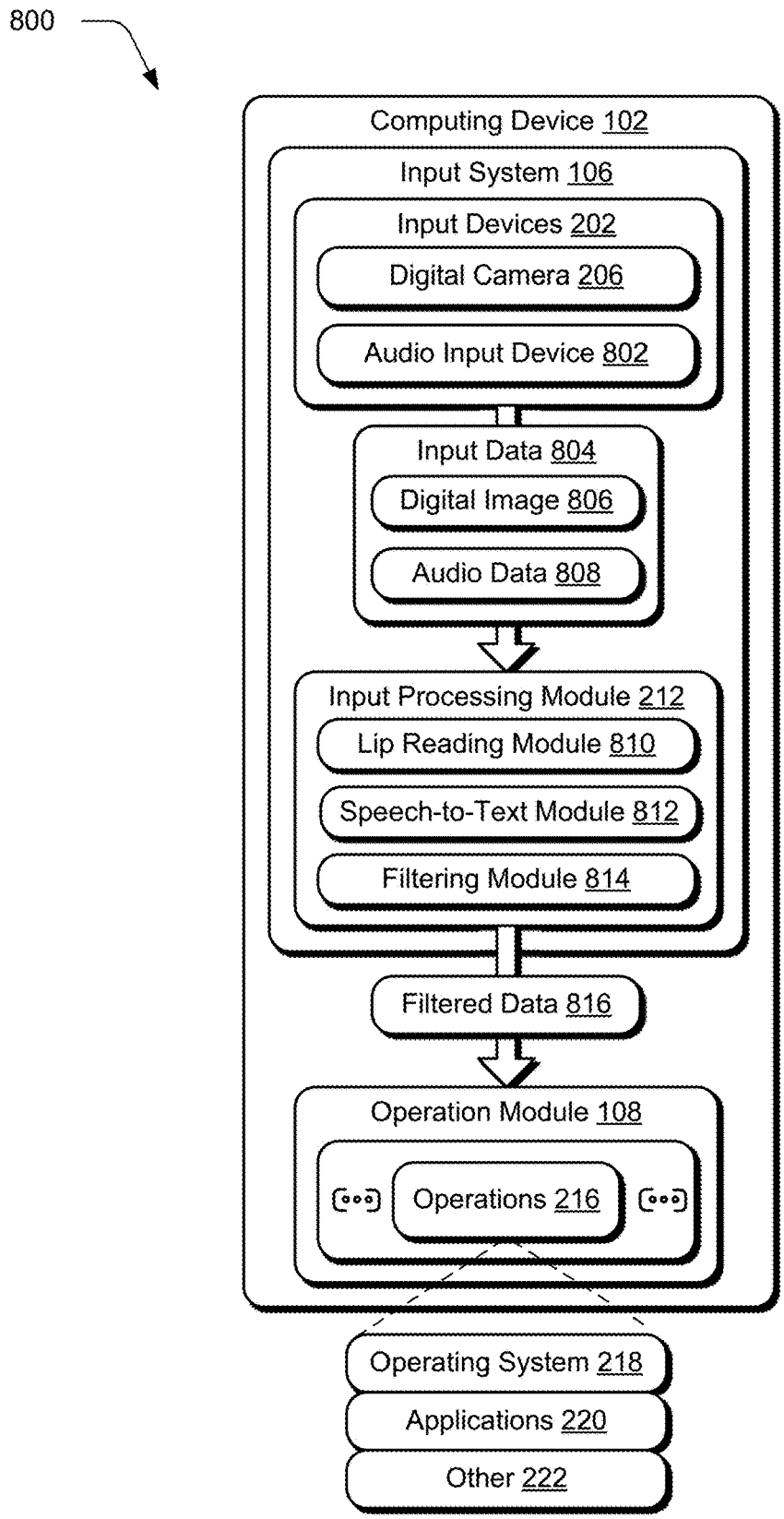
FIG. 8 depicts an example implementation of lip-reading in conjunction with other input modes to initiate an operation of the computing device.

FIG. 8 depicts an example implementation 800 of lip-reading in conjunction with other types of inputs for verification of inputs used to initiate an operation of the computing device 102. FIG. 9 depicts a procedure 900 in an example implementation of lip-reading in conjunction with other input types to improve accuracy and efficiency of detection of inputs used to initiate computing device operations.

The following discussion describes techniques that may be implemented utilizing the previously described systems and devices. Aspects of the procedure as shown stepwise by the modules of FIG. 8 may be implemented in hardware, firmware, software, or a combination thereof. The procedure is shown as a set of blocks that specify operations performed by one or more devices and are not necessarily limited to the orders shown for performing the operations by the respective blocks.

Not only can lip-reading triggering events be used to keep sensitive information confidential and increase efficiency and convenience when environmental conditions or a geographical location make conventional input ineffective or cumbersome, lip-reading can also be used in conjunction with conventional voice recognition technology to further improve accuracy and convenience of user interaction with a computing device. A lip-reading session, for instance, may be used to verify other types of inputs entered into a computing device 102.

In one such example, in an environment with constant background noise, but not so much noise as to render voice recognition completely ineffective, lip-reading technology can be combined with the voice recognition to reduce inaccuracies from voice recognition alone. In addition, by using both voice recognition and lip-reading in conjunction, if a user turns their head such that the mobile device cannot capture the user's lip, mouth, and facial movements accurately for a moment, the voice recognition may be sufficient to continue with the input until the user's face is again in line with the mobile device and lip-reading input is reestablished.

In the illustrated example implementation 800 of FIG. 8, the input system 106 of computing device 102 leverages both a digital camera 206 and an audio input device 802 to generate input data 804. The input data 804 is then received by an input processing module 212. The input data includes a digital image 806 and audio data 808 involving a user's speech (block 902). A user 104, for instance, may speak into a mobile device while facing the device. The digital camera 206 captures digital images 806 of visual cues involving facial features of the user 104, such as lip, mouth, and facial movements, as a lip-reading input via the digital image 806. The audio input device 802, e.g., a microphone, is used to record audio data 808.

Lip-reading text from the digital images 806 is generated based on visual cues associated with the user's speech using lip-reading functionality. Audio text from the audio data 808 is generated using speech-to-text functionality (block 904). As a user speaks into the mobile device while facing the digital camera, for instance, a lip-reading module 810 "reads" the visual cues from the digital image 806 and generates lip-reading text. Concurrently, a speech-to-text module 812 uses speech-to-text functionality to generate audio text from the audio data 808.

The text generated from input data 804 is then processed by the input processing module 212 to identify a computing device operation based on the audio text and the lip-reading text (block 906). For example, the user 104 may be browsing an online marketplace and viewing a particular pair of running shoes they wish to purchase. As the user is viewing the running shoes, they may be speak such things as "I like the blue ones," and "are they my size," and "purchase running shoes." In addition, the user 104 may answer a question posed to them by someone nearby that is not related to this interaction. Based on the text generated by both operations, the filtering module 814 may identify an operation. In this example, "purchase" would be the identified computing device operation.

Once the computing device operation is identified, the audio text or the lip-reading text is filtered to generate filtered data 816 based on relevancy to the identified operation (block 908). The filtering module 814, for instance, filters both the lip-reading text and audio text to identify any text relevant to computing device operations from either type. This filtered data 816, containing the computing device operation relevant text, is then received by the operation module 108 to initiate at least one computing device operation 216. For instance, once the operation "purchase" is identified in the example above, the generated text is filtered in order to generate filtered data that is relevant to the "purchase" operation, e.g., identification of product or service, billing information, and so forth. In this instance, "purchase running shoes" is the relevant information. At least one operation of the computing device is now initiated based on the filtered data 816 (block 910). For example, the purchase of the running shoes is initiated. Other types of inputs may also be verified using data generated as part of a lip-reading session, such as keyboard inputs, gestures, and so forth. In this way, accuracy and efficiency of operation of the computing device 102 is improved.

Lip-Reading Training

Figure 10:
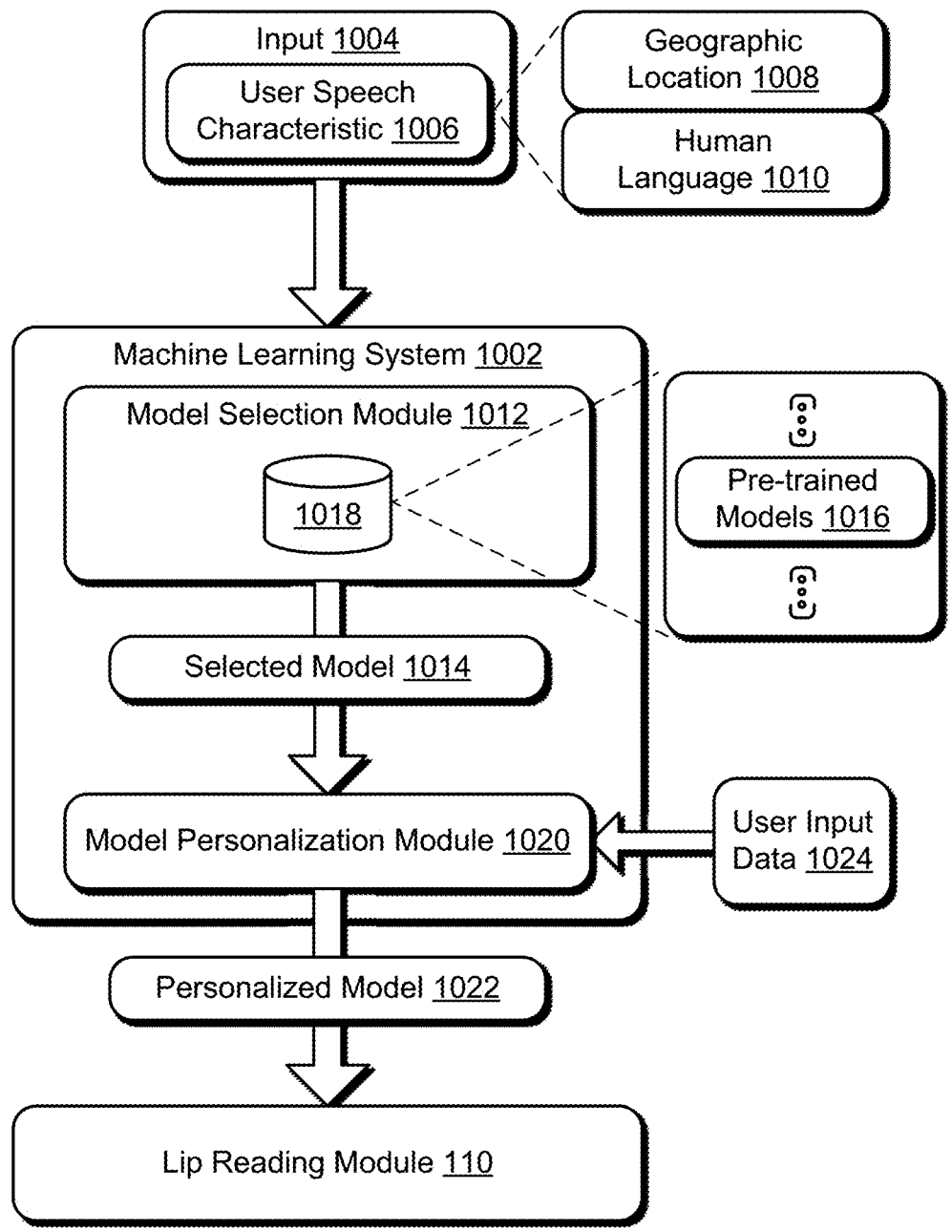
FIG. 10 depicts an example implementation of training a lip-reading module using machine learning for a particular user.
Figure 11:
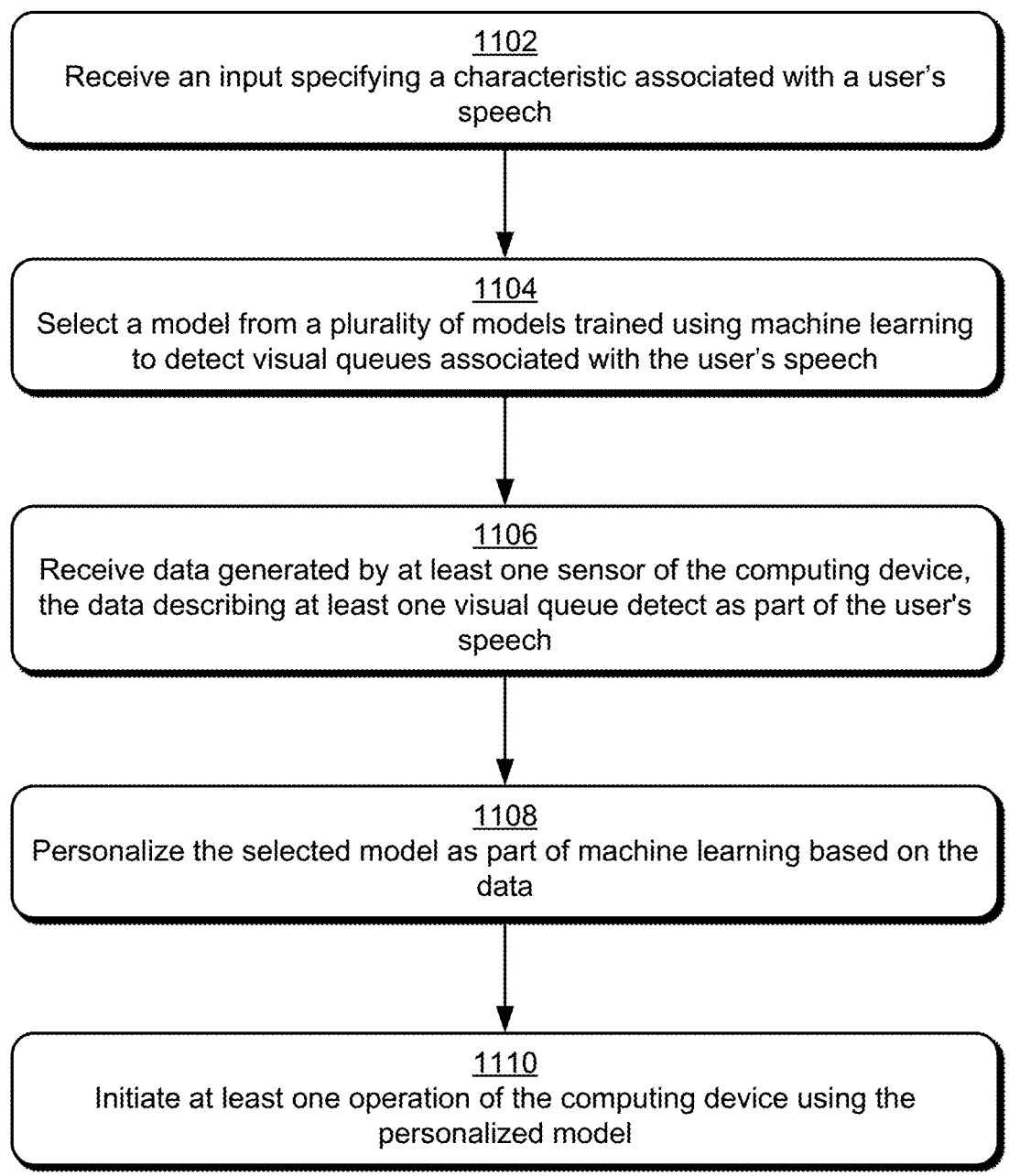
FIG. 11 is a flow diagram depicting a procedure in an example implementation of using machine learning to train a lip-reading module to personalize the computing device for a particular user.

FIG. 10 depicts an example implementation 1000 of training a machine-learning model of the lip-reading module 110 for a particular user. FIG. 11 depicts a procedure 1100 in an example implementation of using machine learning to train a pre-trained model of lip-reading module to personalize lip-reading functionality implemented by the model for a particular user.

The following discussion describes techniques that may be implemented utilizing the previously described systems and devices. Aspects of the procedure as shown stepwise by the modules of FIG. 10 may be implemented in hardware, firmware, software, or a combination thereof. The procedure is shown as a set of blocks that specify operations performed by one or more devices and are not necessarily limited to the orders shown for performing the operations by the respective blocks.

Machine learning can be used to train a computing device 102 to adapt to speech, visual cues, and mannerisms of a particular user in order to personalize the computing device for that user. Other model trained techniques are also contemplated, including statistical models. Conventional techniques used to train models using machine learning or other techniques however, either "started from scratch" requiring a vast amount of training data or started from a generalized model that did not address differences in language and phrasing, such as for ethical terms, differences in expressions based on geographic location or language, and so on. Accordingly, in the techniques described herein, pre-trained models are provided that detect visual cues associated with lip reading, from which a user can choose as a base model. These models are trained using machine learning based on different languages, dialects, geographic locations, and so forth. These pre-trained models can then be further personalized using machine learning to train the computing device to recognize a user's specific visual cues, e.g., speech and mannerisms.

In the illustrated example implementation 1000 of FIG. 10, the machine learning system 1002 receives input 1004 specifying characteristics associated with a user's speech 1006 (block 1102). The user's speech characteristics 1006 include such identifiers as the geographic location 1008, the language being spoken 1010, and any other identifying characteristic, such as dialect, accent, and so forth. Based on the user speech characteristics 1006 of the input 1004, the model selection module 1012 selects a model 1014 from a plurality of models trained using machine learning to detect visual cues associated with the user's speech (block 1104). The selected model, for instance, may be user selected as the closest match to the user's speech characteristics 1006 from the multiple pre-trained models 1016 available.

The pre-trained models 1016 are stored in storage 1018 of the model selection module 1012. Once the model is selected, the model personalization module 1020 can receive user input data, such as from a sensor of the computing device, that describes at least one visual cue detected as part of the user's speech (block 1106). Training, for instance, may be based on visual cues detected by a digital camera as a user reads (e.g., mouths) text output on a display device of the computing device 102. In this way the model personalization module 1020 can develop a personalized model 1022 for the user from the pre-trained selected model 1014 as part of machine learning based on the additional user input data 1024 (block 1108) with increased efficiency and accuracy over conventional machine learning training techniques. The personalized model 1022, once trained, may then be used by the lip-reading module 110 to "read" the user's specific visual cues to initiate operations of the computing device (block 1110). As a result, the personalized model 1022, for instance, may be configured to address particular nuances of speech input as part of the lip-reading session that is not possible using conventional techniques.

Example System and Device

Figure 12:
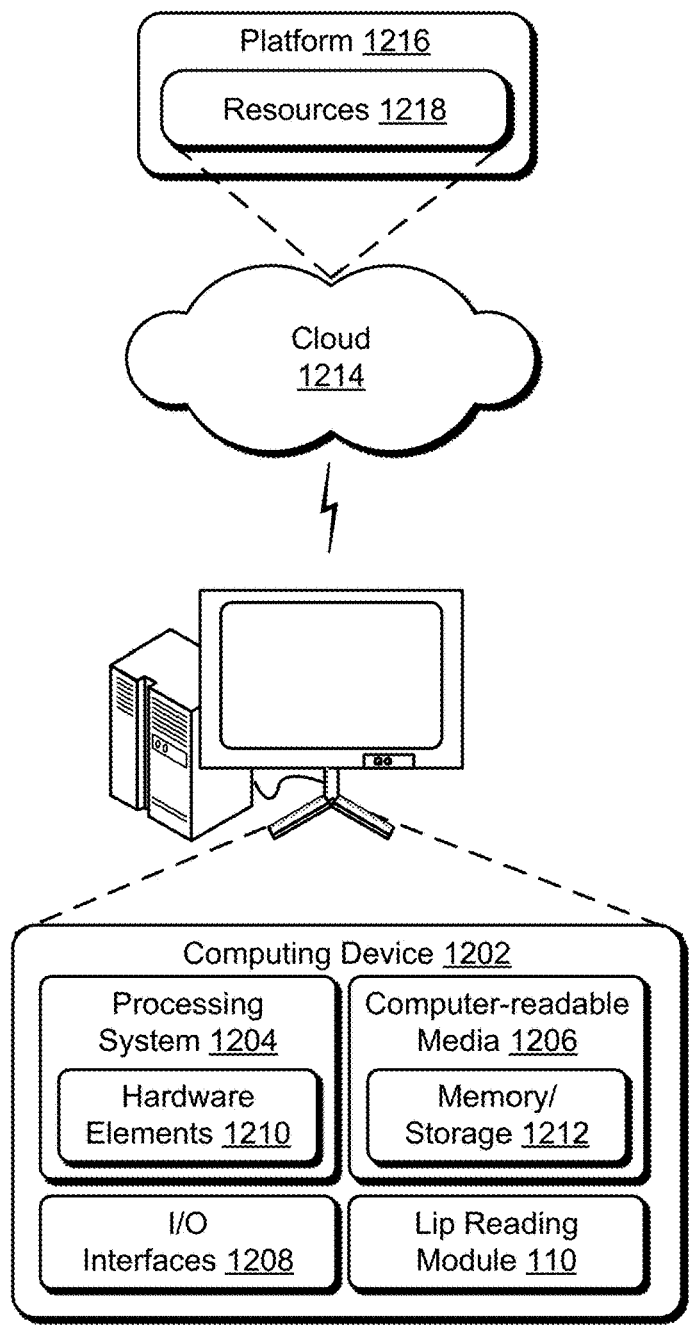
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the lip-reading module 110. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

I claim:

1. A method implemented by a computing device, the method comprising:
    detecting, by the computing device automatically and without user intervention, a physical environment event based on an environmental condition of a physical environment in which the computing device is disposed, the environmental condition of the physical environment being identified from data captured by at least one visual sensor of the computing device;
    initiating, by the computing device, a lip-reading session responsive to detecting the physical environment event;
    generating, by the computing device, input data by detecting one or more visual cues associated with a user's facial features using the at least one visual sensor of the computing device as part of the lip-reading session;
    generating, by the computing device, text based on the input data; and
    initiating, by the computing device, at least one operation of the computing device based on the text.

2. The method of claim 1, wherein detecting the physical environment event is performed responsive to detecting interference within the physical environment from data captured by at least one audio sensor of the computing device.

3. The method of claim 1, wherein initiating the lip-reading session is further performed based on a geographic location at which the computing device is disposed.

4. The method of claim 1, wherein initiating the lip-reading session is further performed based on a temporal event.

5. The method of claim 1, wherein detecting the physical environment event automatically and without user intervention is performed without receiving a manual input from a user.

6. The method of claim 1, wherein initiating the at least one operation of the computing device based on the text is performed without displaying the text at the computing device.

7. A computing device comprising:
    an audio input device;
    a digital camera;
    a processing system; and
    a computer-readable storage medium storing instructions that are executable by the processing system to perform operations comprising:
        generating audio text using audio data captured by the audio input device;
        generating lip-reading text using digital images captured by the digital camera, the lip-reading text generated by detecting visual cues in the digital images using lip-reading functionality;
        identifying a computing device operation based on the audio text and the lip-reading text;
        generating filtered text data by filtering at least one of the audio text or the lip-reading text according to a relevancy of the audio text or the lip-reading text to the identified computing device operation; and
        initiating the computing device operation using the filtered text data.

8. The computing device of claim 7, wherein detecting visual cues in the digital images using lip-reading functionality comprises analyzing movements of a user's facial features as depicted in the digital images and comparing the analyzed movements to a model describing known human facial movements.

9. The computing device of claim 7, wherein detecting visual cues in the digital images using lip-reading functionality comprises analyzing positions of at least one facial feature of a user as depicted in the digital images and comparing the analyzed positions to a model describing known human facial feature positions.

10. The computing device of claim 9, wherein the at least one facial feature comprises a corner of a mouth of the user, a lip of the user, a cheek of the user, a nose of the user, or at least one tooth of the user.

11. The computing device of claim 7, further comprising a depth sensor, wherein generating lip-reading text is further performed using data captured by the depth sensor.

12. The computing device of claim 7, wherein initiating the computing device operation comprises providing the filtered text data as input to an application executed by the computing device.

13. A system comprising:
one or more processors; and
a computer-readable storage medium storing instructions that are executable by the one or more processors to perform operations comprising:
detecting, automatically and without user intervention, a physical environment event based on an environmental condition of a physical environment in which a computing device is disposed, the environmental condition of the physical environment being identified from data captured by at least one visual sensor of the computing device;
initiating a lip-reading session at the computing device responsive to detecting the physical environment event;
generating input data by detecting one or more visual cues associated with a user's facial features using at least one visual sensor of the computing device as part of the lip-reading session;
generating text based on the input data; and
initiating at least one operation of the computing device based on the text.

14. The system of claim 13, wherein detecting the physical environment event is performed responsive to detecting interference within the physical environment from data captured by at least one audio sensor of the computing device.

15. The system of claim 13, wherein initiating the lip-reading session is further performed based on a geographic location at which the computing device is disposed.

16. The system of claim 13, wherein initiating the lip-reading session is further performed based on a temporal event.

17. The system of claim 13, wherein detecting the physical environment event automatically and without user intervention is performed without receiving a manual input from a user.

18. The system of claim 13, wherein initiating the at least one operation of the computing device based on the text is performed without displaying the text at the computing device.

19. The system of claim 13, wherein detecting the environmental condition of the physical environment in which the computing device is disposed comprises identifying, from the data captured by the at least one visual sensor of the computing device, that input at a keyboard of the computing device is not feasible.

20. The system of claim 13, wherein initiating the lip-reading session at the computing device is further performed at a point-in-time that corresponds to a trigger time specified by a user of the computing device for initiating a lip-reading session at the computing device.

\* \* \* \* \*